US008650035B1

(12) United States Patent
Conway

(10) Patent No.: US 8,650,035 B1
(45) Date of Patent: Feb. 11, 2014

(54) SPEECH CONVERSION

(75) Inventor: Adrian E. Conway, Weston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 2076 days.

(21) Appl. No.: 11/281,501

(22) Filed: Nov. 18, 2005

(51) Int. Cl.

| | |
|---|---|
| ***G10L 21/00*** | (2013.01) |
| ***G10L 13/08*** | (2013.01) |
| ***G10L 13/00*** | (2006.01) |
| ***G10L 19/00*** | (2013.01) |
| ***G10L 15/26*** | (2006.01) |
| ***G10L 15/18*** | (2013.01) |
| ***G06F 17/27*** | (2006.01) |
| ***G06F 17/21*** | (2006.01) |

(52) U.S. Cl.
USPC ........... 704/270; 704/260; 704/261; 704/272; 704/220; 704/9; 704/10; 704/235; 704/257; 704/258; 704/270.1

(58) Field of Classification Search
USPC .......... 704/9, 235, 257, 270, 270.1, 261, 272, 704/220, 258, 260, 10; 379/201.11, 88.01
See application file for complete search history.

(56) References Cited

U.S. PATENT DOCUMENTS

| | | | | |
|---|---|---|---|---|
| 5,812,126 | A * | 9/1998 | Richardson et al. | 715/741 |
| 5,911,129 | A * | 6/1999 | Towell | 704/270.1 |
| 6,122,616 | A * | 9/2000 | Henton | 704/258 |
| 6,404,872 | B1 * | 6/2002 | Goldberg et al. | 379/201.11 |
| 6,801,931 | B1 * | 10/2004 | Ramesh et al. | 709/206 |
| 6,820,055 | B2 * | 11/2004 | Saindon et al. | 704/235 |
| 6,970,820 | B2 * | 11/2005 | Junqua et al. | 704/258 |
| 6,983,249 | B2 * | 1/2006 | Sakai | 704/258 |
| 7,113,909 | B2 * | 9/2006 | Nukaga et al. | 704/258 |
| 7,155,391 | B2 * | 12/2006 | Taylor | 704/257 |
| 2002/0072900 | A1 * | 6/2002 | Keough et al. | 704/220 |
| 2002/0161882 | A1 * | 10/2002 | Chatani | 709/224 |
| 2003/0004717 | A1 * | 1/2003 | Strom et al. | 704/240 |
| 2003/0028380 | A1 * | 2/2003 | Freeland et al. | 704/260 |
| 2005/0042581 | A1 * | 2/2005 | Oh et al. | 434/112 |
| 2005/0254631 | A1 * | 11/2005 | Smith et al. | 379/88.01 |
| 2006/0069567 | A1 * | 3/2006 | Tischer et al. | 704/260 |

OTHER PUBLICATIONS

Olinsky et al. "Iterative English accent adaptation in a speech synthesis method," in Speech Synthesis, 2002, Proceddings of 2002 IEEE Workshop on Sep. 11-13, 2002 pp. 79-82.*
K. Yamabana et al., "A speech translation system with mobile wireless client," in ACL 2003, Sapporo, Japan, Jul. 2003.*
B. Zhou, Y. Gao, J. Sorensen, D. D'echelotte, and M. Picheny, "A Hand-held speech-to-speech translation system," in Proc. IEEE ASRU 2003, Dec. 2003.*
Wahlster, W. (2001). Robust Translation of Spontaneous Speech: A Multi-Engine Approach. Invited Paper, IJCAI-01, Proceedings of the Seventeenth International Joint Conference on Artificial Intelligence (pp. 1484-1493). San Francisco: Morgan Kaufmann.*

(Continued)

*Primary Examiner* — Edgar Guerra-Erazo

(57) ABSTRACT

A speech conversion system facilitates voice communications. A database comprises a plurality of conversion heuristics, at least some of the conversion heuristics being associated with identification information for at least one first party. At least one speech converter is configured to convert a first speech signal received from the at least one first party into a converted first speech signal different than the first speech signal.

17 Claims, 3 Drawing Sheets

(56) References Cited

OTHER PUBLICATIONS

*Speechalator: Two-way Speech-to-Speech Translation on a Consumer PDA*; A Waibel et al., Applied Technology, Human Computer Interaction Eurospeech—2003—Geneva, Sep. 1-4, 2003, Technical paper, posted at cmu edu/~awb/papers/ .speechalator.pdf, pp. 369-372.

*Voice Conversion Through Transformation of Spectral and Intonation Features*; D. Rentzos et al., Acoustics, Speech, and Signal Processing, 2004, Proceedings, vol. 1, May 17-21, 2004, pp. 21-24.

*A Segment-Based Approach To Voice Conversion*; Masanobu Abe; Acoustics, Speech, and Signal Processing, 1991 vol. 2, Apr. 14-17, 1991, pp. 765-768.

*Voice Conversion Through Vector Quantization*; Masabobu Abe, Satoshi Nakamura, Kiyohiro Shikano, Hisao Kuwabara; Acoustics, Speech, and Signal Processing, 1988, vol. 1, Apr. 11-14, 1988, pp. 655-658.

*On the Transformation of the Speech Spectrum for Voice Conversion*; G Baudoin, Y. Stylianou; Spoken Language, 1996, Proceedings, vol. 3, Oct. 3-6, 1996, pp. 1405-1408 vol. 3.

* cited by examiner

SPEECH CONVERSION

BACKGROUND

Human speech contains at least two kinds of information: (1) a message, i.e., the content of what is being said, and (2) information related to the identity of the human speaker. The first kind of information, the message, is generally not dependent on the particular speech signal comprising the human speech. However, a particular speech signal generally does contain characteristics relating to the identity of the speaker. Thus, to alter information relating to the identity of a speaker, it is necessary to alter certain characteristics of a speech signal. Accordingly, speech conversion techniques enable the conversion of a first speech signal exhibiting a first set of identifying characteristics to a second speech signal or a converted first speech signal exhibiting a second set of desired characteristics. Thus, the first speech signal in effect receives a new identity, while its message is preserved. That is, speech conversion transforms how something is said without changing what is said.

In general, the object of using speech conversion technology is to make one person's speech sound like that of another. Approaches for accomplishing speech conversion are described in the numerous technical publications for example: "Voice Conversion through Transformation of Spectral and Intonation Features," D. Rentzos et al., Acoustics, Speech, and Signal Processing, 2004, Proceedings, Volume 1, 17-21 May 2004, pages: 21-24; "On the Transformation of the Speech Spectrum for Voice Conversion," G. Baudoin et al., Spoken Language, 1996, Proceedings, Volume: 3, 3-6 Oct. 1996, pages: 1405-1408 vol. 3; "A Segment-Based Approach to Voice Conversion," M. Abe, Acoustics, Speech, and Signal Processing, 1991 Volume: 2, 14-17 Apr. 1991, pages: 765-768; "Voice Conversion through Vector Quantization," M. Abe et al., Acoustics, Speech, and Signal Processing, 1988, Volume: 1, 11-14 Apr. 1988, pages: 655-658; and "Speechalator: two-way speech-to-speech translation on a consumer PDA," A. Waibel et al., Applied Technology, Human computer Interaction, Eurospeech 2003-Geneva, Sep. 1-4, 2003, Technical paper, posted at cmu.edu/~awb/papers/_speechalator.pdf, pages: 369-372. Each of the foregoing references is hereby incorporated herein by reference in its entirety.

Examples of speech conversions include, but are not limited to, speech-tone translations, gender translations, accent translations, and speech enhancement for persons with impaired speech characteristics. Further, some speech converters are capable of altering the spectral characteristics of a speech signal. Moreover some speech converters are capable of converting an original speech signal to a different language. Those skilled in the art may be aware of yet other examples of speech conversion.

In general, speech converters work by analyzing speech samples of at least one, but usually more, speakers. This analysis requires collecting data relating to the voice characteristics, e.g., gender, speech accent, speech tone, etc., of original and target speakers. Once such data has been collected, a conversion heuristic may be created for converting an original speaker's speech characteristics into those of a target speaker.

Speech conversion techniques are presently used in isolated settings to convert the speech signal of a particular human speaker, i.e., to make a particular person sound like someone else. Thus, present speech converters have not been adapted for use on a large scale, or in systems in which they may be called upon to transform a wide variety of speech signals. Accordingly, although speech conversion techniques and systems are known to be used for making one person's speech sound like that of another person, such techniques and systems have not been used to facilitate public voice communications.

Nonetheless, present systems and networks for voice communications are required to accommodate speakers with widely varying speech characteristics, even where different speakers are speaking the same language. In different regions of the United States, for example, people speak with widely varying accents, some of which may sound quite strong and be quite difficult to understand for a person from another region of the country. Further, in lieu of ever-increasing globalization, it is not uncommon for persons using public voice communications to be speaking in a language that is the person's second or even third language, again producing an accent and other speech characteristics that may make the person difficult to understand. It is also not unusual for persons who do not have a language in common to have the need to conduct a conversation. Further, in certain situations it may be desirable for a speaker, even where the speaker may be perfectly understood, to mask certain voice characteristics. For example, law enforcement personnel may want to alter speech characteristics indicative of a person's gender or age. Similarly, there are situations in which a user's security would be enhanced by the alteration of certain speech characteristics. For example, there may be situations in which it would enhance a woman's safety to convert her speech signal so that her voice sounded male. Further, many speakers with speech impairments are presently unable to communicate effectively, if at all, using public communications networks.

Accordingly, there is a need for a public voice communication network whereby subscribers to the network can selectively choose to have original speech signals converted to a different speech signal. Such a voice communication network would provide at least the benefits of safety, surveillance, amusement, and/or enhanced comprehension.

BRIEF DESCRIPTION OF THE DRAWINGS

The accompanying drawings illustrate various embodiments of systems and methods of speech conversion and are part of the specification. The illustrated embodiments are merely examples and do not limit the scope of the systems and methods described herein. Throughout the drawings, identical reference numbers designate identical or similar elements. In the drawings.

DETAILED DESCRIPTION OF PREFERRED EMBODIMENTS

Overview

Figure 1:
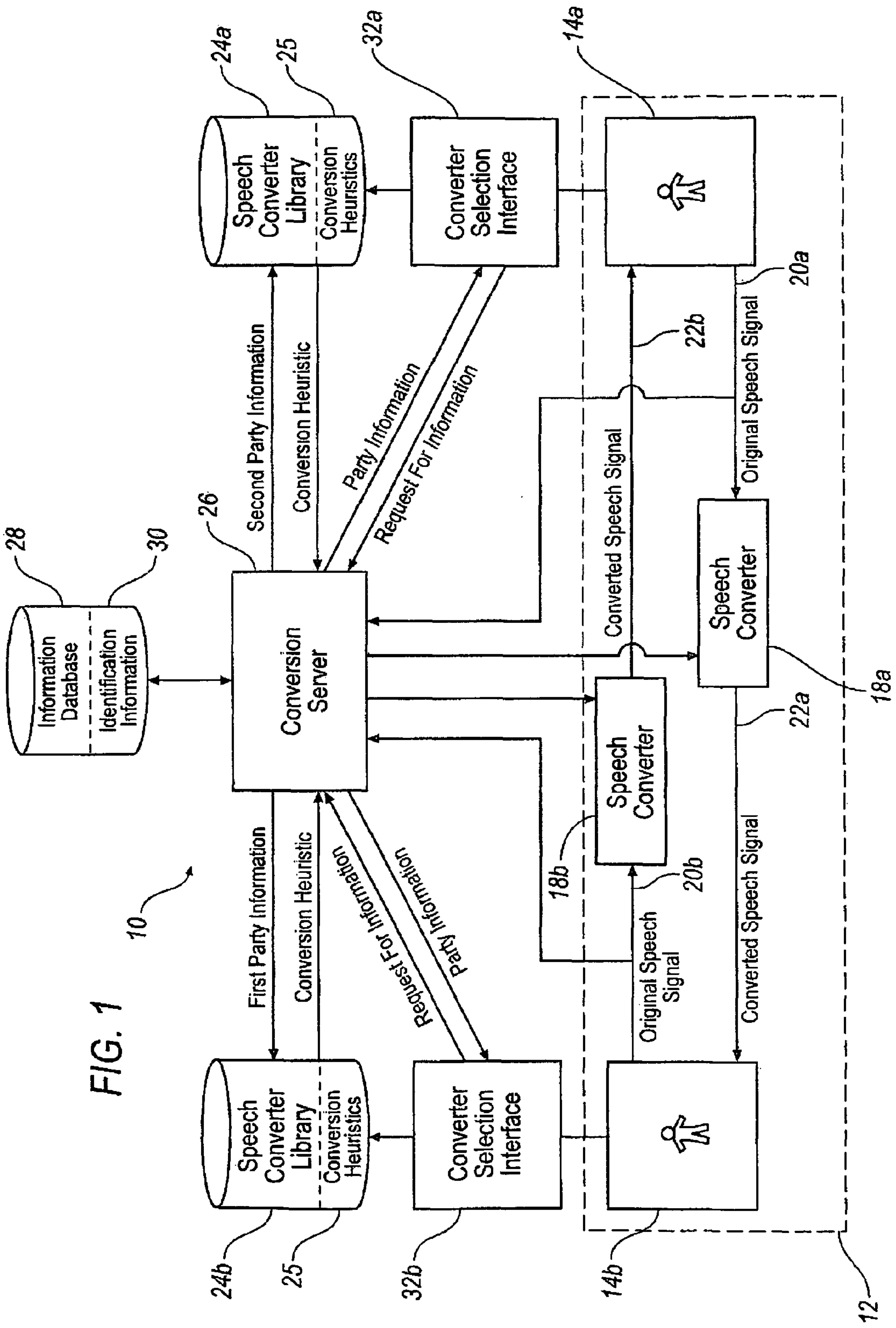
FIG. 1 is a block diagram of a speech conversion system for voice communication networks, according to an embodiment.

FIG. 1 depicts a speech conversion system 10, according to an embodiment. In the illustrated embodiment the system 10 includes a voice communication network 12 that facilitates voice communications between two or more parties 14.

Voice communication network 12 may be any voice communication network known to those skilled in the art for facilitating voice communication between two or more parties 14. For example, the system 10 may include a public switched telephone network (PSTN) or a wireless voice communication network such as a cellular phone network and/or a Voice over Internet Protocol (VoIP) network Further, it is possible that the system 10 could include other kinds of voice communications network 12, or could include a combination of different kinds of voice communications network 12.

Parties 14 may be human beings. However, one or more parties 14 may be an automated agent or some other form of automated caller configured to provide an original speech signal 20 that may be input to a speech converter 18.

Speech Converters

The speech conversion system 10 includes at least one speech converter 18 configured to convert an original speech signal 20 received from a party 14. For example, FIG. 1 shows a first speech converter 18*a* deployed so as to be able to receive an original speech signal 20*a* from a first party 14*a*, and to convert the speech signal 20*a* to a converted speech signal 22*a* that is transmitted to a second party 14*b*. Similarly, FIG. 1 shows a second speech converter 18*b* deployed so as to be able to receive an original speech signal 20*b* from a party 14*b*, and to convert the speech signal 20*b* to a converted speech signal 22*b* that is transmitted to the first party 14*a*. It should be understood that embodiments are possible that include only one speech converter 18, and also that embodiments are possible that include more than two speech converters 18, the number of speech converters 18 being theoretically unlimited. Further, it should be understood that embodiments are possible in which two or more parties 14 participate in a call, but original speech signals 20 from some of the parties 14 are not provided to a speech converter 18.

Speech converter 18 may be any speech converting device known to those skilled in the art capable of receiving an original voice signal 20 and converting the received original signal 20 to a different voice signal 22. For example, speech converter 18 may be configured to perform speech conversions including gender translations, accent translations, language translations, speech tone translations, speech enhancements such as enhancements to clarity and volume, or other types of speech conversion known to those skilled in the art. Preferably, the speech converter 18 performs speech conversion in real or near real time so as not to substantially increase propagation delay of speech signals being transmitted over the voice communication network 12. The speech converter 18 may be implemented using hardware and/or software in a manner known by those skilled in the art.

Parties 14 provide original, i.e., unconverted, speech signals 20 It should be understood that, in embodiments in which one or more of the parties 14 is an automated agent, one or more of original speech signals 20 may be synthesized. As described above, speech converter 18 is configured to convert an original speech signal 20 into a converted speech signal 22.

Speech Converter Library

A speech converter library 24 includes a number of speech conversion heuristics 25 that may be applied to convert an original speech signal 20 to a converted speech signal 22. The speech converter library 24 may be implemented using hardware and/or software according to techniques known to those skilled in the art. In one embodiment, speech converter library 24 is a combination of hardware and software, and includes a database such as is known to those skilled in the art for storing conversion heuristics 25. Conversion heuristics 25 may include any heuristics known to those skilled in the art for performing speech conversion, including gender translations, accent translations, speech tone translations, speech enhancements, language translations, etc It should be understood that system 10 can include one or more speech converter libraries 24. For example, FIG. 1 shows two speech converter libraries 24*a* and 24*b*, corresponding to the two depicted parties 14*a* and 14*b*. While in practice it may not be feasible to provide a separate speech conversion library 24 for each party 14 participating in the system 10, it should be understood that it may be desirable for different sets of parties 14 (e.g., subscribers to system 10 in different regions of a country, persons with a particular speech impairment, etc.) to access different speech converter libraries 24. That is, different sets of conversion heuristics 25 generally will be appropriate for different sets of parties 14. Further, it is desirable to include multiple speech converter libraries 24 in system 10 for the purpose of enhancing the scalability of the system 10 However, it should also be understood that embodiments are possible that deploy only one speech converter library 24.

Conversion Server

Conversion server 26 receives an original speech signal 20 from a party 14 and determines identification information 30 about that party 14. Identification information 30 may include any information that may be associated with a party 14, including, but by no means limited to, area code and telephone number, geographic location, Internet Protocol (IP) address, gender, speech accent, and speech impairments. Those skilled in the art will recognize that different kinds of party identification information 30 may be appropriate depending on the kind of network 12 to which speech signals 20 are being provided. For example, the IP address of a caller 14 would only be relevant in cases where network 12 includes a VoIP network.

The conversion server 26 is attachable to the voice communication network 12. The conversion server 26 may be implemented using hardware and/or software according to techniques known to those skilled in the art. In one embodiment, conversion server 26 is a combination of hardware and software, and, in addition to communicating with speech converter library 24, communicates with an information database 28, such as is known to those skilled in the art for storing conversion heuristics 25 and/or party identification information 30. In some embodiments, conversion server 26 and speech converter library 24 are located on one physical computing machine. In some embodiments, conversion server 26 and information database 28 are additionally or alternatively located on different physical computing machines. It should be understood that, while FIG. 1 shows one conversion server 26 and one information database 28, embodiments are possible that include a plurality of conversion servers 26 and/or a plurality of information databases 28.

Conversion Heuristics

In some embodiments, speech converter library 24 may be queried for an appropriate conversion heuristic or heuristics 25 from a conversion server 26, the query including party identification information 30, such as an area code and telephone number. For example, if party identification information 30 indicates that a party 14 is in a region where persons are likely to have strong accents, it may be desirable to employ a conversion heuristic 25 that converts a speech signal 20 to remove some, or all, of the accent. As discussed below, party information 30 may originate from a variety of sources.

In addition, or as an alternative, to selecting a conversion heuristic 25 based on party identification information 30, it is possible that a query could include the identification of one or more conversion heuristics 25 that may be applied to the speech signal 20 of a party 14 with whom party identification information 30 is associated. Further in addition, or as another alternative, it is possible that conversion heuristics 25 may be selected by a party 14 through a converter selection interface 32, as described in more detail below Party Identification Information As mentioned above, party identification information 30 may be obtained in a variety of ways. The conversion server 26 is able to determine some party identification information 30 about a party 14 based on information obtained from an original speech signal 20 transmitted over voice communication network 12. Conversion server 26 generally includes hardware and/or application software for receiving an original speech signal 20 and then determining identification information 30 based on the received original speech signal 20. For example, those skilled in the art will recognize that, after receiving an original speech signal 20, it may be possible to determine party identification information 30 such as the area code and telephone number of the party 14. Such party identification information 30 may be provided to speech converter library 24 for the determination of a conversion heuristic or heuristics 25 as explained below, or used by conversion server 26 to determine further party identification information 30 relating to the party 14. For example, conversion server 26 will determine the geographic location from which speech signal 20 is received by using the detected area code. The conversion server 26 may also use the area code and telephone number to perform a search of a local telephone directory corresponding to the determined geographic area whereby the name of a caller 14 can be determined The first speech signal 20 may be further analyzed by the conversion server 26 to determine other information 30, such as the caller's gender or dialect, by using techniques known to those skilled in the art.

The conversion server 26 may also determine party identification information 30 that includes characteristics such as gender, speech impairments, speech tone, language spoken, and any other information that may be used by speech converter library 24 to select the most appropriate speech conversion heuristic or heuristics 25 for converting an original speech signal 20 to a converted speech signal 22. The conversion server 26 may be configured to receive the first speech signal 20 from a party 14, determine party identification information 30 about the party 14, and provide this party identification information 30 to speech converter library 24, which then can automatically select at least one speech conversion heuristic 25 to be used to convert the original speech signal 20.

The conversion server 26 may not be able to readily determine from the received original speech signal 20 certain useful party identification information 30, e.g., age, ethnicity, hearing capacity, etc., associated with a party 14. Such party identification information 30 may need to be obtained through other means, such as a questionnaire provided to subscribers to the system 10. Information so obtained may be stored as party identification information 30 in the conversion server 26 and/or in information database 28 for retrieval after an original speech signal 20 from a party 14 has been received by the conversion server 26. In embodiments using party identification information 30 provided by a party 14, the conversion server 26 is capable of extracting some basic party identification information 30, such as the area code and telephone number, from a speech signal 20 that can be used to retrieve the stored party identification information 30 associated with the party 14 from database 28.

Speech Converter Selection Interface

As mentioned above, parties 14 may be subscribers to a service that provides speech conversions for communications over a voice network 12. Accordingly, in some embodiments, converter selection interface 32 is used to allow one or more of the parties 14 to manually select at least one speech conversion heuristic 25 from the speech converter library 24 for converting speech signals 20 in a desired manner. For example, a party 14 in Texas may have difficulty understanding a party 14 with a strong Michigan accent, and could select a speech conversion heuristic 25 accordingly. Similarly, a male law enforcement officer may wish to emulate the voice of a female, and may further wish to disguise his accent. Such speech conversions may be selected through speech converter selection interface 32

Speech converter selection interface 32 may be provided through a variety of means known to those skilled in the art, including a telephone, touch-tone key pad, a computer keyboard, a computer mouse, a touch screen, a voice activated interface, an interface associated with a cell phone or personal data assistant, or a web page interface. The converter selection interface 32 preferably allows a party 14 to listen to the converted speech signal 22 corresponding to the speech signal of the party 14 who selected the one or more speech conversion heuristics 25 in order to ascertain that the desired speech conversion has been accomplished.

A first party **14*a* may use a converter selection interface 32*a* to request identification information 30*b* from the conversion server 26 about another party 14*b* prior to making a call. Party identification information 30*b* about the party 14*b* so obtained may be used to select at least one conversion heuristic 25 through the speech converter interface 32*a*. Accordingly, a speech signal 20*a* from the first party 14*a* is converted by speech converter 18*a* before being transmitted to the second party 14*b*. In some embodiments, as mentioned above, the converter selection interface 32*a* is capable of allowing the first party 14*a* to listen to the converted speech signal 22*a* to ensure that the desired conversion has been accomplished before the converted speech signal 22*a* is transmitted to the second party 14*b* Also, in some embodiments one or more of the parties 14 is provided with the ability to disable the speech conversion system 10 using the converter selection interface 32 such that communication over the voice communication network 12** can be accomplished without speech conversion.

Further, in some embodiments, the converter selection interface 32 may be used to disable the automatic selection of the at least one conversion heuristic 25 by speech converter library 24, so that a party **14*a* can select the at least one conversion heuristic 25 desired for a call. The selection may be made based on all, some, or none of the party identification information 30 determined by the conversion server 26 about another party 14*b*. If the party 14*a* desires to initiate a call to a party 14*b*, he or she may use the converter selection interface 32 to send a request for identification information to the conversion server 26 to cause the conversion server 26 to provide identification information 30 about the party 14*b* via the converter selection interface 32. In this fashion, a party 14*a* can select the at least one conversion heuristic 25 to be used to for converting a speech signal 20*a* based on the requested identification information 30**.

Figure 2:
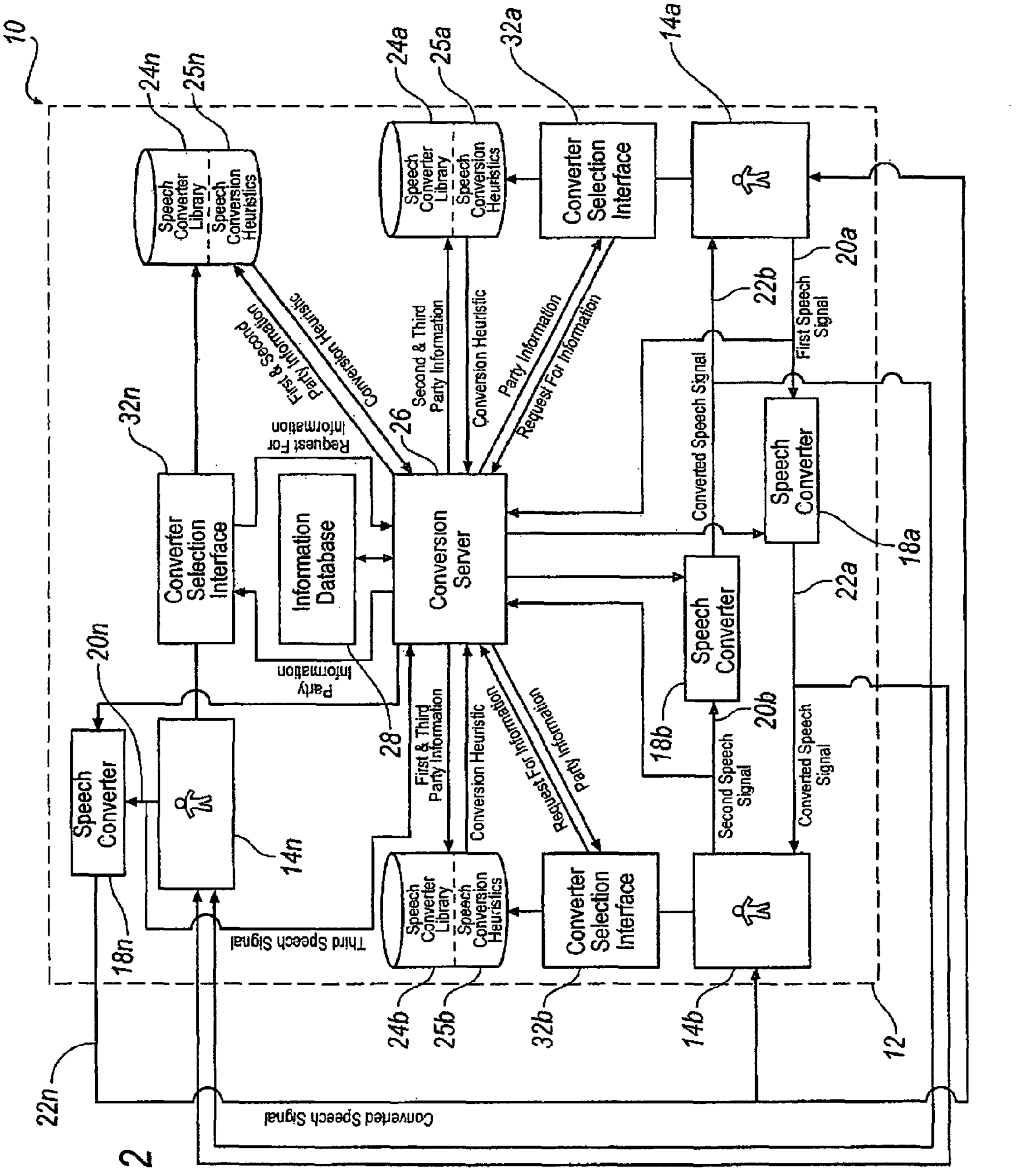
FIG. 2 is a block diagram of a speech conversion system for voice communication networks, according to a further embodiment.

It will be apparent to those skilled in the art that the embodiments of the call processing system 10 described herein may be advantageously used by one or more called parties 14, a calling party 14, or some or all simultaneously, so that comprehensible, efficient, and effective voice communications may be carried out over a voice communication network 12 in real or near real time despite parties 14 having different accents, impairments, etc Conference Calling FIG. 2 illustrates speech conversion system 10 being utilized to facilitate a conference, or multi-party, call over the voice communication network 12, conference calls being well known to those skilled in the art.

In one embodiment, prior to beginning a conference call with the second parties 14*b* . . . 14*n*, a first party 14*a* selects the at least one conversion heuristic 25*a* from speech converter library 24*a* by using a converter selection interface 32*a* for converting a speech signal 20*b* provided by a party 14*b*. The party 14*a* may select the same conversion heuristic or heuristics 25 for all second parties 14*b* . . . 14*n*, or may select different conversion heuristic or heuristics 25*a* . . . 25*n* for some or all of the parties 14*b* . . . 14*n*. For example, the party 14*a* may choose at least one conversion heuristic 25*a* that converts a speech signal 20*b* from speech spoken with an Texas accent to speech spoken with a British accent for transmitting to first party 14*b*, and selects at least one conversion heuristic 25*b* that converts speech spoken with a Texas accent to speech spoken with a New York accent for transmitting to a second party 14*c*. After the conversion heuristic or heuristics 25 have been selected and a conference call is initiated, the parties 14 will receive converted speech signal 22 in accordance with the particular conversion heuristic or heuristics 25 selected for the respective parties 14

In other embodiments, after parties 14*b* . . . 14*n* are connected with a first party 14*a* in a conference call, speech converter library 24 automatically selects conversion heuristic or heuristics 25 for converting each speech signals 20*a* . . . 20*n* and transmitting converted speech signals 22*a* . . . 22*n* to the respective parties 14. This determination takes place for each party 14 in the same manner as described above with respect to FIG. 1.

Exemplary Process Flow

Figure 3:
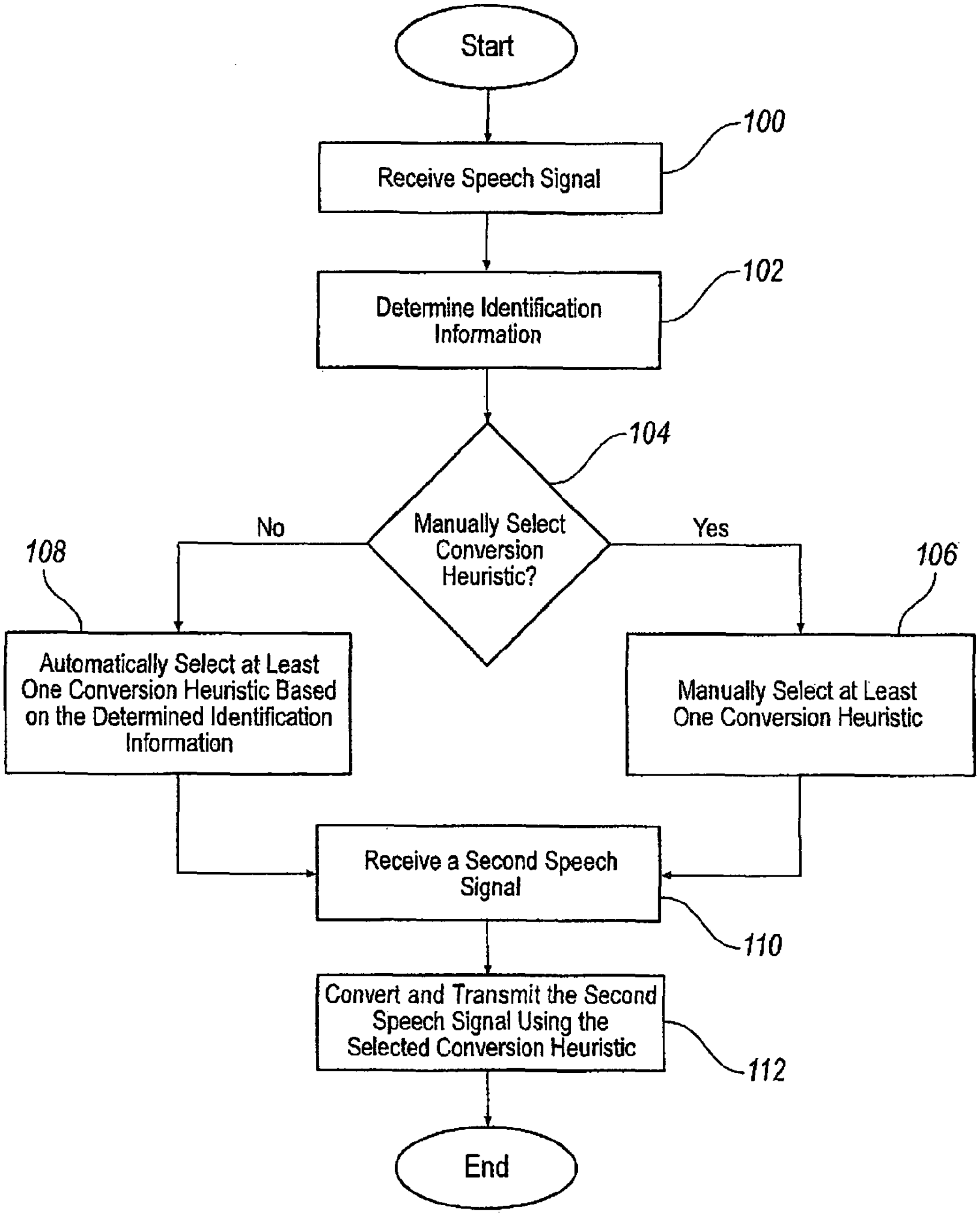
FIG. 3 depicts a process flow for using a speech conversion system for voice network according to an embodiment.

FIG. 3 depicts an exemplary process for selecting a conversion heuristic or heuristics 25, according to an embodiment. It should be understood that embodiments including other process flows having steps in a different order and/or different steps are possible.

At step 100, the conversion server 26 receives a speech signal 20*a* from a party 14*a* Control then advances to step 102.

At step 102, the conversion server 26 determines identification information 30 about the party 14*a* using the received speech signal 20*a*. Control then proceeds to step 104.

At step 104, a second party 14*b* provides input via the converter selection interface 32 indicating a decision whether to manually select a conversion heuristic or heuristics 25 from the speech converter library 24 or to let a conversion heuristic or heuristics 25 be automatically selected based on the determined identification information 30. Of course, embodiments, not represented in FIG. 3, are also possible in which a party 14 is required to manually select a conversion heuristic or heuristics 25 and/or in which interface 32 is not provided, a conversion heuristic or heuristics 25 being automatically selected. If the second party 14*b* decides to manually select the conversion heuristic or heuristics 25 then processing advances to step 106. If not, then processing advances to step 108.

At step 106, the second party 14*b* manually selects the conversion heuristic or heuristics 25 from the speech converter library 24. This step may further include the step of requesting identification information 30 about the first party 14*a* from the conversion server 26 such that the second party 14*b* can select the conversion heuristic or heuristics based on the requested identification information 30. Control then proceeds to step 110.

At step 108, the conversion heuristic or heuristics 25 are automatically selected based on the identification information 30 determined by the conversion server 26. As mentioned above, two or more conversion heuristics 25 may be combined for performing the appropriate speech conversion on the original speech signal 20 to be transmitted over the voice communication network 12 as a converted voice signal 22. Next, processing advances to step 110.

At step 110, the speech signal 20*b* from the second party 14*b* is received at the selected speech converter(s) 18. Control then proceeds to step 112.

At step 112, the speech signal 20*b* from the second party 14*b* is converted by the conversion heuristic or heuristics 25 associated with the at least one speech converter 18 and transmitted to the first party.

CONCLUSION

The foregoing description has been presented only to illustrate and describe embodiments of the claimed invention. It is not intended to be exhaustive or to limit the invention to any precise form disclosed. It is to be understood that the invention disclosed herein may be practiced other than as specifically explained and illustrated, and that the scope of the invention should be limited only by the following claims.

What is claimed is:

1. A system comprising:

a database comprising a plurality of conversion heuristics, at least one of the plurality of conversion heuristics being associated with identification information about a first party determined from a first speech signal received from the first party;

at least one speech converter configured to convert, according to the at least one conversion heuristic associated with the identification information for the first party, the first speech signal received from the first party into a converted first speech signal different than the first speech signal; and at least one conversion server configured to communicate with the at least one speech converter, the at least one conversion server configured to determine the identification information about the first party from the first speech signal and retrieve the at least one conversion heuristic based at least in part on the identification information determined about the first party, wherein at least one of the database and the at least one speech converter is at least partially implemented using a hardware device.

2. The system of claim 1, further comprising at least one conversion server configured to communicate with the at least one speech converter.

3. The system of claim 1, further comprising at least one converter selection interface configured to allow the first party to manually provide additional identification information.

4. The system of claim 3, wherein the at least one speech converter is further configured to transmit the converted first speech signal to a second party different than the first party, and wherein the at least one converter selection interface is configured to allow the second party to manually select the at least one conversion heuristic.

5. The system of claim 1, wherein two or more conversion heuristics are used for converting the first speech signal to the converted first speech signal.

6. The system of claim 1, wherein the identification information used to select the at least one conversion heuristic includes at least one of a geographic location, an area code, a telephone number, an Internet Protocol (IP) address, a gender, a classification of a speech accent, and a classification of a speech impairment.

7. The system of claim 1, wherein the at least one speech converter is selected to perform at least one of a gender translation, an accent translation, a language translation, a speech tone translation, and a speech enhancement.

8. A system comprising:

a database comprising a plurality of conversion heuristics; and at least one speech converter configured to convert a first speech signal received from a first party into a converted first speech signal according to at least one first party conversion heuristic retrieved from the database based on identification information about a first party determined from the first speech signal from the first party, and transmit the converted first speech signal to at least one second party different than the first party; and wherein said at least one speech converter is further configured to convert at least one second speech signal received from the at least one second party into a respective at least one converted second speech signal according to at least one second party conversion heuristic retrieved from the database based on identification information determined from the at least one second speech signal about the at least one second party, and transmit the at least one converted second speech signal to the first party;

at least one conversion server configured to communicate with the at least one speech converter, the at least one conversion server configured to determine the identification information about at least one of the first party from the first speech signal and the at least one second party from the at least one second speech signal and retrieve at least one of the at least one first party conversion heuristic and the second party conversion heuristic, such retrieval based at least in part on the identification information determined about the first party from the first signal or the identification information determined about the at least one second party from the at least one second signal, respectively, wherein at least one of the database and the at least one speech converter is at least partially implemented using a hardware device.

9. The system of claim 8, further comprising at least one converter selection interface configured to allow the at least one first party conversion heuristic or the at least one second party conversion heuristic to be manually selected.

10. The system of claim 8, wherein two or more conversion heuristics are used for converting the first speech signal.

11. The system of claim 8, wherein two or more conversion heuristics are used for converting the at least one second speech signal.

12. The system of claim 8, wherein the identification information used to select the at least one conversion heuristic includes at least one of a geographic location, an area code, a telephone number, an Internet Protocol (IP) address, a gender, a classification of a speech accent, and a classification of a speech impairment.

13. The system of claim 8, wherein the at least one speech converter is selected to perform at least one of a gender translation, an accent translation, a language translation, a speech tone translation, and a speech enhancement.

14. A method comprising:

receiving a first speech signal;

determining identification information about a party based on the received speech signal using a conversion server;

selecting at least one conversion heuristic from a database based on the identification information, wherein the database is at least partially implemented using a hardware device; and converting the first speech signal to a second speech signal according to the at least one conversion heuristic.

15. The method of claim 14, wherein the identification information used to select the at least one conversion heuristic includes at least one of a geographic location, an area code, a telephone number, an Internet Protocol (IP) address, a gender, a classification of a speech accent, and a classification of a speech impairment.

16. The method of claim 15, further comprising receiving input from a speech converter interface, wherein the selecting step uses the input to select the at least one conversion heuristic.

17. The method of claim 15, wherein the converting step includes at least one of a gender translation, an accent translation, a language translation, a speech tone translation, and a speech enhancement.

* * * * *